(No Model.)

E. BROWN.
MERCURY PRESSURE GAGE.

No. 379,305. Patented Mar. 13, 1888.

Witnesses
Frank Evans,
John F. Grant,

Inventor:
Edw Brown,

UNITED STATES PATENT OFFICE.

EDWARD BROWN, OF PHILADELPHIA, PENNSYLVANIA.

MERCURY PRESSURE-GAGE.

SPECIFICATION forming part of Letters Patent No. 379,305, dated March 13, 1888.

Application filed June 30, 1887. Serial No. 243,044. (No model.)

*To all whom it may concern:*

Be it known that I, EDWARD BROWN, a citizen of the United States, residing at Philadelphia, in the county of Philadelphia and State of Pennsylvania, have invented a new and useful Mercury-Gage, of which the following is a specification.

My invention relates to those mercury-gages in which the pressure acts directly upon an open column of mercury without the intervention of springs, diaphragm, or compressed air.

The object of my invention is to permit of the exchange of a broken glass indicating-tube for a new one without materially affecting the accuracy of the gage. To accomplish this I connect the glass indicating-tube to a mercury-cup of much larger diameter by means of a screw packing-box which is below the 0 upon the scale, and the said packing-box and zero-point of the scale are below a horizontal plane which cuts through the said enlarged mercury-chamber. By this construction the accuracy of the instrument may always be verified by disconnecting it from its machinery and filling the chamber with mercury until it stands at 0 in the glass tube.

The accompanying drawings illustrate my invention, in which—

Figure 1:
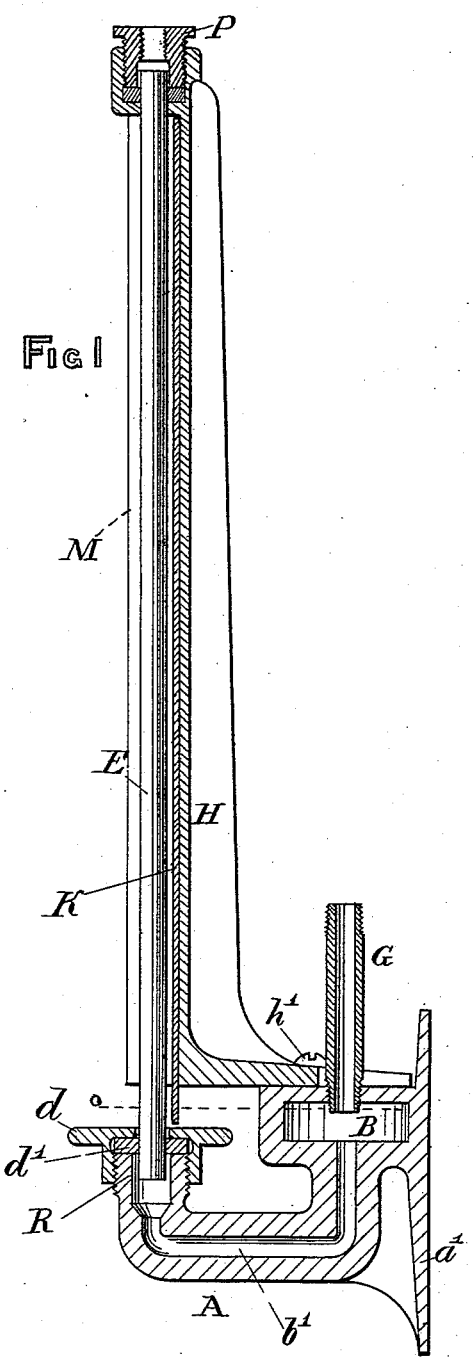
Figure 2:
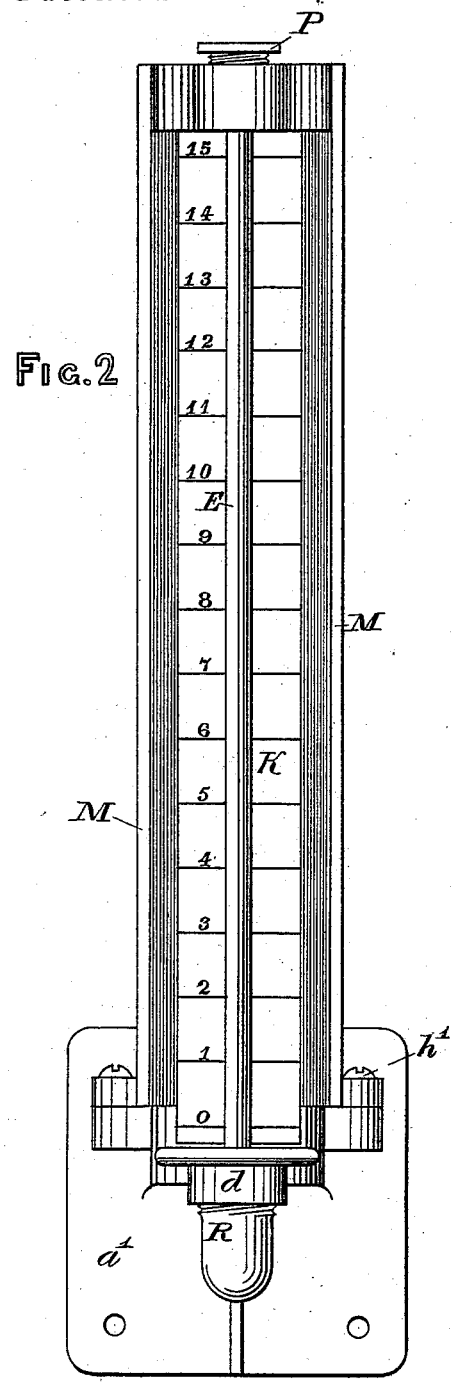

Figure 1 is a vertical section through the gage. Fig. 2 is a front view.

A is the iron casting to contain the mercury. $a'$ is a flange by which the gage is secured to the wall. In the said casting is an enlarged recess, B, forming a mercury-chamber, which communicates with the screw packing-box R by the channel $b'$. This packing-box R is screwed to receive a gland, $d$, and a rubber washer, $d'$, surrounds the glass tube E, thus making an air-tight joint to connect the glass tube with the mercury-chamber. Into the mercury-chamber is screwed the short piece of iron pipe G, by which the gage is connected to the machinery to be indicated.

Upon the iron casting A is secured the arm H by two screws, $h'$. This arm is to steady the upper end of the glass tube and to carry the scale-plate K, upon which is cut the pounds pressure corresponding to a certain height of the mercury. There are also cast upon this arm ribs or flanges M—one on each side—to protect the glass tube.

To use the gage after placing it in position, mercury is poured into the chamber B until it stands at the level of the line 0 in the glass tube. It is then ready for use as a pressure-gage.

When the instrument is used as a vacuum-gage, the connection is made with the screwed gland P in the top packing-box instead of the short pipe G.

The glass tubes of mercury-gages are subject to occasional breakage, and the great advantage of this gage over any other is in the facility with which it can be repaired. The mercury chamber being of a definite large diameter, the size of the glass tube may vary in its bore from one-eighth to three-sixteenths of an inch without materially affecting the accuracy of the gage. Tubes of this size are usually to be procured in any large town by the owner of a gage, and the necessity is obviated of sending the gage a long distance for repairs. It is practically always accurate and indestructible as long as an owner can purchase an ordinary glass tube of commerce approximating in size.

I claim—

1. In an open-column mercury-gage, a steadying-arm, H, carrying an index-plate, an enlarged mercury-chamber, B, a tube, G, connecting the mercury-chamber with the apparatus to be tested, the indicating glass tube E, connected direct to the enlarged mercury-chamber B by the channel $b'$, the screwed packing-box R, packing $d'$, and gland $d$, the said packing-box and zero-point of the scale being below a horizontal plane which passes through the said mercury-chamber.

2. In an open-column mercury-gage, the combination of the scale-steadying arm H, with the protecting-flanges M cast thereon, the enlarged mercury-chamber B, a tube, G, connecting the mercury-chamber with the apparatus to be tested, an indicating glass tube, E, connected direct to the enlarged mercury-chamber B by the channel $b'$, the screwed packing-box R, packing $d'$, and gland $d$, the said packing-box and zero-point of the index being below a horizontal plane which passes through the said mercury-chamber.

EDW. BROWN.

Witnesses:
FRANK EVANS,
JOHN F. GRANT.